United States Patent [19]

Vogel et al.

[11] Patent Number: 4,913,183
[45] Date of Patent: Apr. 3, 1990

[54] THERMO PLASTIC CARBONATED WATER MANIFOLD AND METHOD OF MAKING SAME

[75] Inventors: James D. Vogel, Anoka, Minn.; Kenneth W. Schneider, Mason City, Iowa

[73] Assignee: Schneider Metal Manufacturing Co., Mason City, Iowa

[21] Appl. No.: 180,515

[22] Filed: Apr. 12, 1988

[51] Int. Cl.$^4$ .......................... F16L 55/18; B67D 5/56
[52] U.S. Cl. ................... 137/15; 137/561 A; 222/129.1; 285/21; 285/197
[58] Field of Search ............... 222/129.1; 285/21, 197; 137/561 A, 15; 251/145

[56] References Cited

U.S. PATENT DOCUMENTS

| | | | |
|---|---|---|---|
| 3,002,871 | 10/1961 | Tramm et al. | 285/21 |
| 3,649,055 | 3/1972 | Nilsen | 285/21 |
| 3,892,335 | 7/1975 | Schroeder | 222/129.1 |
| 4,253,224 | 3/1981 | Hickman et al. | 285/197 |
| 4,316,557 | 2/1982 | Benoun et al. | 222/129.1 |
| 4,624,487 | 11/1986 | Thalmann | 285/21 |
| 4,712,578 | 12/1987 | White | 137/561 A |
| 4,722,560 | 2/1988 | Guest | 285/423 |
| 4,781,309 | 11/1988 | Vogel | 222/129.1 |

FOREIGN PATENT DOCUMENTS 2359359 2/1978 France ........................ 285/197

Primary Examiner—A. Michael Chambers
Attorney, Agent, or Firm—Henry C. Kovar; Sten Erik Hakanson

[57] ABSTRACT

A rigid thermoplastic manifold for the distribution of pressurized carbonated water has an elongate tubular thermoplastic body with a plurality of apertures spaced along its length, a plurality of identical thermoplastic outlet fittings which each have at inlet spud with a sonic energy director and a pair of arcuate sonic energy directors spaced one on each side from the spud, each outlet fitting being fastened and sealed to the tube with three discrete sonic welds. A method of making the manifold is also provided.

20 Claims, 2 Drawing Sheets

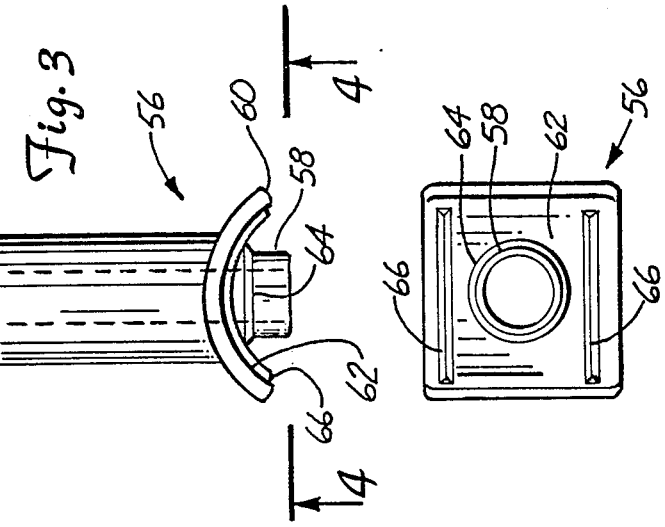
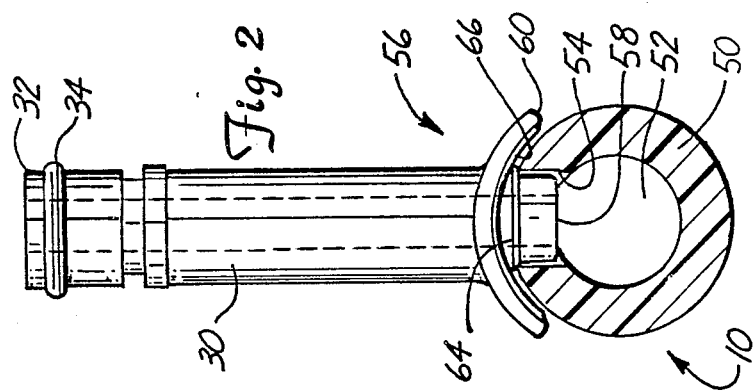

THERMO PLASTIC CARBONATED WATER MANIFOLD AND METHOD OF MAKING SAME

BACKGROUND OF THE INVENTION

1. Field of the Invention

This invention pertains to a thermoplastic carbonated water distribution manifold for a soft drink beverage dispenser, and to a method of making the manifold.

2. The Prior Art

A post-mix carbonated beverage dispensing system makes its own carbonated water from a supply of municipal or well water, and then distributes the carbonated water to a plurality of post-mix valves. Each post-mix valves mixes carbonated water with syrup and effects dispensing of a complete beverage. These dispensers are typically found in fast food retailers, theatres, convention centers, sports facilities and the like, and are most often used to fill cups with beverage.

Most all of these plural flavor post-mix dispensers have some type of structure to distribute carbonated water from a single source which may be single or plural carbonator to a plurality of dispensing valves. There typically will be a minimum of four dispensing valves and it is common to see up to of four dispensing valves and it is common to see up to twelve dispensing valves being supplied from a single carbonator.

The structure that distributes the carbonated water has been a continual source of problems and a cause of decarbonation and foaming during dispensing. One structure for distributing carbonated water was a molded plastic housing with metal ferrules for an inlet and plural outlets.

These devices had to be located remote from the cooling structure and during stand by time, carbonated water in the housing would warm up and decarbonate. Leakage, ferrule breakage, stress cracks and sanitation were also continually reoccuring problems.

A metal block with a bored out center section, with bored and tapped transverse aperture with adapter fittings has also been used. These are expensive, heavy, bulky, leaky, very difficult to sanitize and are not an effective solution. A typical example is U.S. Pat. No. 3,175,578.

The most recently commercially used structure for distributing carbonated water is a manifold made of an elongate length of stainless steel tubing forming an elongate plenum.

At least one end of the tube is closed and the other end may be an inlet or may be closed. Several transverse fittings are welded into apertures drilled transversely into the plenum tube. The transverse fittings are then welded into the plenum tube. This structure has been in use for several years and is the least costly, and most structurally efficient known device for distributing carbonated water in a dispenser. A typical example of this structure is shown in U.S. Pat. No. 3,892,335.

The problem is that it may or may not properly dispense carbonated water and beverage; you really don't know until the dispenser has been in use for a period of time. The problem results from the welding of the transverse fittings to the plenum tube. The weld usually breaks through at least one of the transverse tubes and causes an obstruction in the tube. Carbonated water flowing over the obstruction then decarbonates and the dispensing valve foams. A given manifold may have five good outlets and one bad outlet; it may have three bad outlets, it may have a bad inlet, it may be perfectly good. Whether the manifold is a good one or a defective one can't be visually determined. Consequently the quality control and quality repeatability of these manifolds is very poor. These manifolds are also a sanitary problem because of crevices in the weld, and/or crevices where the weld has not completely penetrated. The welds in this manifold cannot be viably inspected from the inside. The retailer or beverage entity that ends up with a defective manifold has to go through all kinds of exercise to determine the manifold is defective. Usually dispensing valves will be changed, sanitizing will be done, and a serviceman will attempt to adjust the dispenser.

This is a serious irritant and quality problem for the food and beverage industry. Carbonated water is a very unique and delicate substance to handle, convey and distribute, while preventing decarbonation and resultant foaming of beverage.

OBJECTS OF THE INVENTION

It is an object of this invention to provide an effective thermoplastic carbonated water distribution manifold for a soft drink dispenser.

It is an object of this invention to provide a soft drink dispenser having an improved carbonated water distribution manifold.

It is an object of this invention to provide a method of making thermoplastic carbonated water distribution manifold for a soft drink dispenser.

SUMMARY OF THE INVENTION

A thermoplastic carbonated water distribution manifold has an elongate tube with an internal plenum, an inlet to the plenum, plugs closing ends of the plenum, a plurality of radial apertures through the tube and into the plenum, a plurality of discrete thermoplastic outlet fittings with each fitting having one end connectible to a dispensing valve and an inlet spud on the other end, and a sonic welding energy director on each spud and fused into a respective aperture.

In a cold carbonated beverage dispenser having a carbonator and a plurality of post-mix dispensing heads, the improvement of a thermoplastic carbonated water distribution manifold having an elongate thermoplastic tube with a plurality of radial apertures through the tube and into an interior plenum, an inlet, a plurality of thermoplastic outlet fittings, an inlet spud on an inlet end of each fitting, a shoulder around the spud, and a sonic welding energy director on each spud and fused into a respective aperture of the tube.

A method of making a thermoplastic carbonated water distribution manifold has the steps of cutting a length of thermoplastic tube, making a plurality of spaced apart radial apertures through the wall of the tube, providing a plurality of thermoplastic outlet fittings having an inlet spud with a sonic welding energy director, inserting each spud in a respective aperture, and sonic welding the director to the tube.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 2 is a cross-sectional view taken through lines II—II;

FIG. 3 is a detail plan view of the inlet end of the outlet fittings in the structure of FIG. 1.

DESCRIPTION OF THE PREFERRED EMBODIMENT

Figure 1:
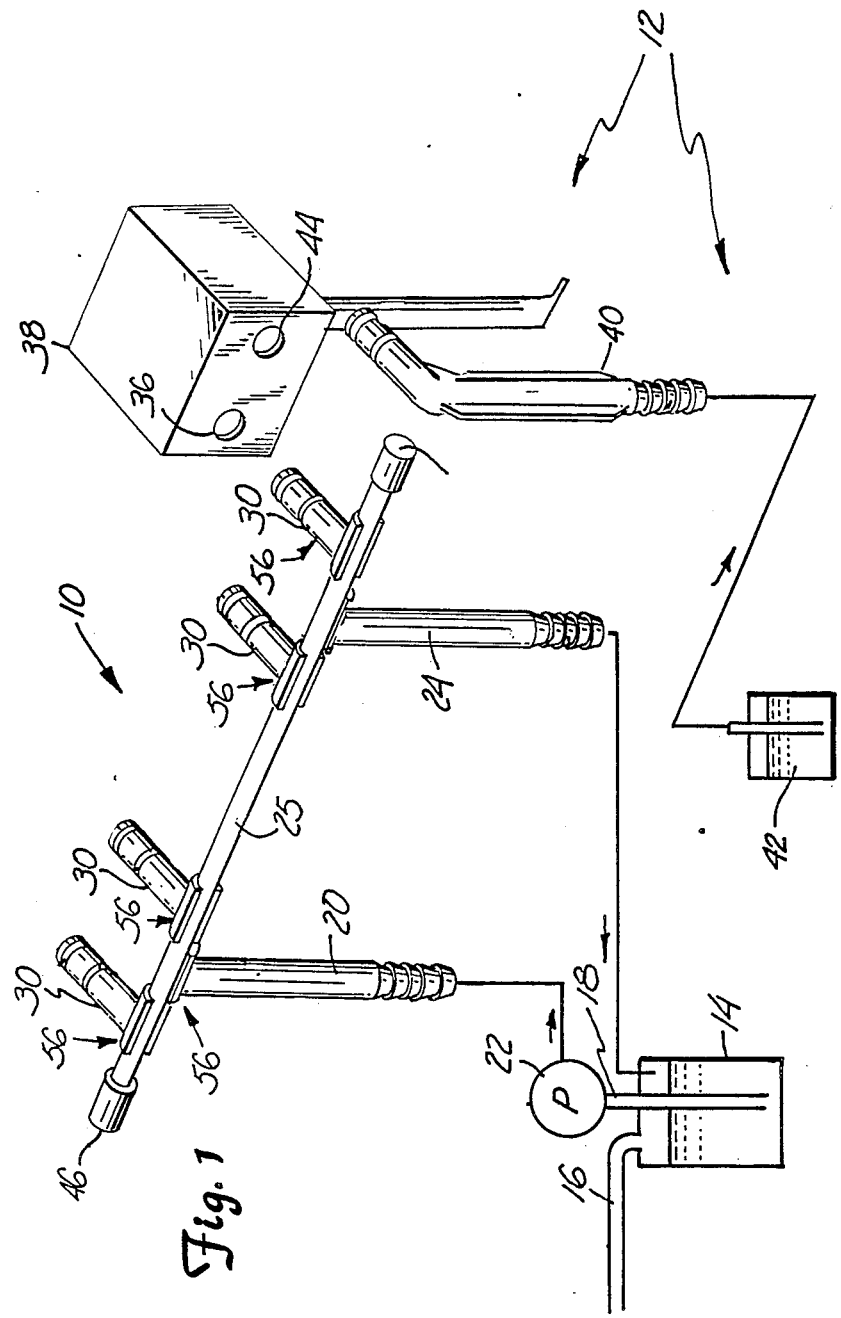
FIG. 1 is a perspective view of the preferred embodiment of thermoplastic carbonated water distribution manifold of the present invention, also shown is a schematically diagrammed beverage dispenser system which the manifold improves.

According to the principles of the present invention, a thermoplastic carbonated water distribution manifold as shown in FIG. 1 and generally indicated by the numeral 10 is provided for a cold carbonated beverage dispenser system, generally indicated by the numeral 12.

The dispenser or dispensing system 12 has a carbonator 14 with an inlet 16 connected to a source of water and an outlet 18 fluidly connected to an inlet fitting 20 of the manifold 10. A pump 22 may be provided in the carbonated water line for providing circulation of carbonated water to the manifold 10 and then out a circulation outlet fitting 24 and back to the carbonator 14 for recooling. The inlet fitting 20 and circulation outlet fitting 24 may be identical. The manifold 10 has a plurality of thermoplastic carbonated water outlet fittings 30, each of which has an outlet end 32 with a seal 34 for direct and sealing insertion into the water inlet 36 of a respective beverage dispensing head 38. A discrete thermoplastic connector 40 is provided for connecting a syrup source 42 to a syrup inlet 44 of the dispensing head 36. An end plug 46 is on each end of the manifold 10.

An important feature of this invention is the structure and the method of making of the multiple component thermoplastic carbonated water distribution manifold 10. An elongate piece of constant section extruded rigid thermoplastic tube 50 is cut to a desired predetermined length. The inside of the tube 50 is the plenum 52 for carbonated water distribution along the length of the manifold 10. A plurality of constant diameter radial apertures 54 are bored through the wall of the tube 50 and into the plenum 52. These apertures 54 are spaced from each other appropriately along the length of the tube 50 with one aperture 54 being provided for each outlet fitting 30. The axis of the apertures 54 are all in a line and are co-planar in a flat plane extending outward from the axis of the tube 50.

The outlet fittings 30 are identical and have an inlet end generally indicated by the numeral 56 with an inlet spud 58 having an outer diameter sized to slip fit within the apertures 54. Surrounding the spud 58 is a convex saddle 60 which extends outward all around the spud 58 forming a shoulder for determination of the depth of insertion of the spud 58 into an aperture 54 and for reinforcement of each outlet fitting 30. The saddle 60 has a convex outward facing arcuate shoulder surface 62 which has the same radius as and is conformable to the tube 50. The spud 58 has a sonic welding energy director 64 adjacent to and projecting outward from the saddle shoulder surface 62. On each end of the saddle shoulder surface 62 is an arcuate saddle sonic welding energy director 66 which also is generated on the same radius as the tube 50 and which is also conformable to the outer diametric surface of the tube 50. The saddle 60, arcuate shoulder surface 62 and arcuate energy directors 66 have an arcuate extent or length, as measured from the axis of the tube 50, that is at least 90 degrees and preferably 120 degrees. This arcuate extent is greater than the apertures as measured in tube 50. The arcuate energy directors 66 are spaced along the length of the tube 50 from the aperture 54, the spud 58 and the spud energy director 64. The inlet fitting 20 and circulation outlet fitting 24 each have an identical end 56 with a spud 58 and sonic energy directors 64, 66 likewise secured to the tube.

In the manufacture of the manifold 10 and in the practice of the invention, the tube 50 is prepared and provided as previously described. The plurality of identical outlet fittings 30 are provided. The tube 50 is placed upon a sonic welding anvil. Each outlet fitting 30 is loaded into a sonic welding horn. The spud 58 is piloted into the aperture 54. The ultrasonic energy is then applied through the horn and the outlet fitting 30. The spud energy director 64 is driven into and fused to the tube 50 at and in the aperture 54. A near field weld is then produced along the length of the spud 58 and aperture 54. The near field weld extends from the spud energy director 64 all the way into the plenum. A "near field weld" is welding occuring within ¼ inch (6 mm) from the point of horn contact with the outlet fitting 30.

Simultaneously, each arcuate energy director 66 is driven into the outer surface of the tube 50 and ultrasonically welded to the tube 50. The welds between energy directors 64, 66 and the tube 50 are structurally discrete welds, specifically there are three discrete welds. The spud 58 weld provides a fluid tight seal for pressurized carbonated water as well as retention of the outlet fitting 30 to the tube 50. The arcuate sonic welds between the saddle director 66 and the tube 50 provide stable re-inforcement of the outlet fitting 30 as well as stress distribution to prevent twisting or blow out of the outlet fitting 30 from the tube 50. The three welds are spaced from each other and are geometrically discrete.

The manifold 10 and the method described herein, are extremely effective for carbonated water distribution. Cost is low and value is high. The manifold doesn't need pickling and passivating, and the manifold doesn't affect taste and does not react with carbonic acid. There is no metal welding. All components of the manifold 10 are injection molded. The manifold has low thermal conductivity and is extremely suitable for being surrounded with urethane foam thermal insulation. The manifold 10 is ideally suited for robotic assembly.

Although other advantages may be found and realized and various modifications may be suggested by those versed in the art, it should be understood that we wish to embody within the scope of the patent warranted hereon, all such embodiments as reasonably and properly come within the scope of our contributions to the art.

We claim as our invention:
1. A thermoplastic carbonated water distribution manifold for fluidly connecting a plurality of post-mix carbonated beverage dispensing valves to a singular source of carbonated water, comprising:
   (a) an elongate thermoplastic tube having an elongate internal carbonated water plenum;
   (b) inlet means secured to said tube for introducing carbonated water into the plenum;
   (c) plugs closing the ends of the plenum;
   (d) a plurality of radial apertures through the tube and into the plenum, said apertures being spaced from each other and being in a line along the length of the tube, said apertures having their axis in a common flat plane;

(e) a plurality of discrete elongate tubular thermoplastic water outlet fittings having their axis in said plane, each outlet fitting having means on one end for direct connection to the water inlet of a beverage dispensing valve, and a spud on the second and opposite end, each spud being in a respective aperture; and (f) a sonic welding energy director on a diametric periphery of each spud, each energy director being sonically fused into the thermoplastic tube within the respective aperture.

2. The manifold of claim 1, in which the apertures are constant diameter bores into the plenum.

3. The manifold of claim 1, including a near field weld extending inward from said energy director to said plenum.

4. The manifold of claim 1, in which each outlet fitting has a saddle between the spud and a body of the fitting, each saddle being sonic welding to said tube.

5. The manifold of claim 4, in which each saddle has an energy director on each side of the spud.

6. The manifold of claim 5, in which each saddle energy director is arcuately conformable to the tube and has an arcuate length which wraps around the tube beyond the spud.

7. The manifold of claim 6, in which each saddle energy director is spaced transversely from the spud, said spuds and said saddle energy directors forming three discrete welds between each outlet fitting and the tube.

8. In a cold carbonated beverage dispenser having a carbonator with a carbonated water outlet and an inlet having means for being connected to sources of water and carbon dioxide; and a plurality of post-mix carbonated beverage dispensing heads, each head having a discrete means for being connected to a respective discrete source of beverage syrup;

the improvement of a carbonated water distribution manifold fluidly connecting the carbonator water outlet to a carbonated water inlet of each dispensing head, said manifold having:

(a) an elongate thermoplastic tube having an elongate internal carbonated water plenum;

(b) inlet means secured to said tube for introducing carbonated water into the plenum;

(c) a discrete tubular thermoplastic outlet fitting to each dispensing head, each outlet fitting having a tubular outlet end fluidly connected and sealed to a respective dispensing head carbonated water inlet;

(d) a plurality of radial apertures through the tube and into the plenum, there being one aperture for each outlet fitting with said apertures having their axis in a common single flat plane;

(e) a tubular plastic inlet spud on an inlet end of each outlet fitting, each inlet spud being in a respective aperture;

(f) a circumferential shoulder around each said inlet end and abutted against the exterior of said tube; and (g) a sonic welding energy director on the diametric periphery of each inlet spud, each energy director being fused into the thermoplastic tube around the perimeter of a respective aperture.

9. The improvement of claim 8, including a near field weld between each spud and a respective aperture, each near field weld extending into the plenum.

10. The improvement of claim 8, in which each outlet fitting has a saddle on its inlet end, each saddle being secured to the tube.

11. The improvement of claim 9, in which each saddle has a pair of saddle sonic welding energy directors welded to the tube.

12. The improvement of claim 11, in which the saddle energy directors are each spaced from a respective spud along the length of the tube.

13. The improvement of claim 11, in which each saddle energy director is arcuately conformable to the tube and has a continuous arc of at least 90 degrees adjoined to the tube.

14. The improvement of claim 11, in which the spud energy directors and saddle energy directors define three discrete welds between each outlet fitting and the tube.

15. A method of making a thermoplastic carbonated water distribution manifold comprising the steps of (a) cutting an elongate extruded and rigid thermoplastic tube to a predetermined length;

(b) making a plurality of discrete and spaced apart apertures along the length of the tube and through said tube from outside to inside, said apertures having axis in a common single flat plane;

(c) providing a like plurality of rigid thermoplastic outlet fittings, each fitting having a tubular outlet end sealably connectible to the water inlet of a post-mix beverage dispensing valve and an inlet spud on an opposite end;

(d) inserting each inlet spud into a respective aperture; and (e) sonic welding an energy director on each spud into a respective said aperture.

16. A method according to claim 15, including the further step of near field welding an outside diameter of each spud to a respective aperture.

17. A method according to claim 15, including the further steps of providing a saddle on opposite sides of the spud, and securing said saddle to said tube.

18. A method according to claim 17, including the steps of providing saddle energy directors in said saddle and on opposite sides of the spud, and sonic welding said saddle energy directors to said tube.

19. A method according to claim 18, in which said saddle energy directors are provided to be arcuately conformable to said tube.

20. A method according to claim 19, including the step of providing said saddle energy director with an arcuate extent which wraps around the tube beyond an arcuate width of each aperture and spud.

* * * * *